May 27, 1947.  T. A. BAKER  2,421,003
FLUID FLOW RESPONSIVE DEVICE
Original Filed May 12, 1942
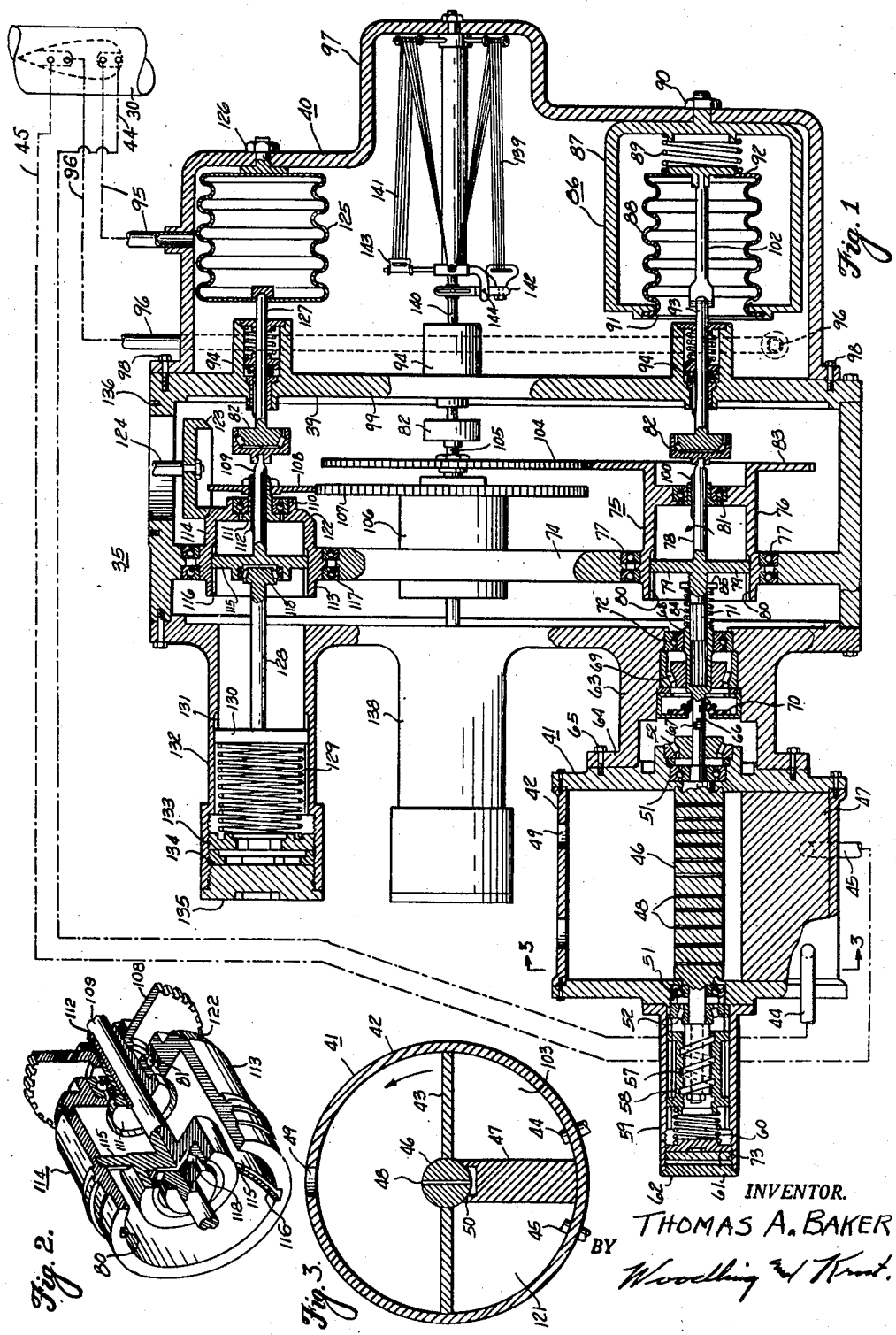
INVENTOR.
THOMAS A. BAKER
BY Patented May 27, 1947

2,421,003

UNITED STATES PATENT OFFICE 2,421,003

FLUID FLOW RESPONSIVE DEVICE

Thomas A. Baker, Logansport, Ind.

Original application May 12, 1942, Serial No. 442,711. Divided and this application September 23, 1942, Serial No. 459,410

12 Claims. (Cl. 73—205)

This invention is a division of my application Serial No. 442,711, filed May 12, 1942, for Fluid measuring and regulating mechanism, and relates in general to a fluid flow responsive device and more particularly to a mechanism for measuring the weight rate of flow through a conduit.

An object of my invention is the provision of means for measuring the weight rate of flow of a fluid passing through a flow duct passage.

Another object of my invention is the provision of means for measuring the weight rate of flow of air passing through an air duct passage wherein the means compensates for the density of the air flowing through the air duct passages.

Another object of my invention is the provision of means for compensating for changes in the density of the air while measuring the weight rate of the flow of air through an air duct passage.

Another object of my invention is the provision of means for compensating for changes in the temperature of the air while measuring the weight rate of the flow of air through an air duct passage.

Another object of my invention is the provision of means for compensating for changes in the humidity of the air while measuring the weight rate of the flow of air through an air duct passage.

Another object of my invention is the provision of means for compensating for changes in the absolute pressure of the air while measuring the weight rate of the flow of air through an air duct passage.

Another object of my invention is the provision of means for compensating for changes in the temperature and absolute pressure of the air while measuring the weight rate of the flow of air through an air duct passage.

Other objects and a fuller understanding of my invention may be had by referring to the following description and claims, taken in conjunction with the accompanying drawings, in which like parts are designated by like reference characters and, in which:

Figure 1 is a cross-sectional view of my air measuring mechanism;

Figure 2 is a perspective and cross-sectional view of one of the variable drive means employed in my air measuring mechanism; and Figure 3 is a cross-sectional view taken along the line 3—3 of Figure 1.

With reference to Figure 1, my invention is arranged to measure the weight rate of flow of air passing through the air duct 30. Any suitable means for supplying air to the duct 30 may be employed. The measuring or fluid flow responsive device is indicated generally by the reference character 35.

My air flow responsive device or measuring mechanism 35 is shown in an enlarged cross-sectional view in Figure 1 and comprises generally a variable gearing compartment indicated by the reference character 39 and a density factor compartment indicated generally by the reference character 40 and a velocity pressure unit indicated generally by the reference character 41. The density factor compartment 40 is arranged to receive a continual sample of the air from the air duct 30. The continuous sampling of the air from the air duct 30 is supplied through the density factor compartment 40 through a duct 95 and is returned back to the air duct 30 through an air passage 96. The air is continually circulated through the density factor compartment 40 by reason of the fact that the air duct 95 is responsive to the total pressure of the air in the duct 30 whereas the air duct 96 is responsive to the static pressure of the air in the air duct 30, thereby producing a differential pressure which forces the air continually through the density factor compartment. In the top of the density factor compartment 40 is mounted a temperature responsive bellows 125, in the middle of the compartment is mounted a moisture responsive device 139 and in the bottom of the compartment is mounted an absolute pressure responsive device 86. These three responsive devices give a movement or measurement which is a function of the density of the air by-passed through the density factor compartment 40 from the air supply duct 30 to the internal combustion engine. In other words, in my air measuring device I compensate for changes in the density of the air so that a true measurement or movement is given which corresponds to the actual quantity or weight of air passing through the duct 30. The temperature responsive bellows 125 may be suitably anchored to the side wall of the density factor compartment 40 by means of a stub shaft having a nut 126 threadably engaging same. As the temperature of the air in the compartment increases the bellows actuate the shaft 127 to the left. At the place where the shaft 127 passes through the wall 99 that separates the density factor compartment from the variable gearing compartment 39, a shaft seal 94 is provided to keep the density factor compartment sealed from the variable gearing compartment. The moisture responsive device 139 comprises a plurality of moisture responsive elements 141 having one end anchored to a fixed support 143 and having their other end connected to a movable pivotal lever 142, which is pivotally mounted at 144 so that as the moisture responsive elements 141 change their elongation the shaft 140 is moved in a transverse direction. The moisture responsive elements 141 may be made of any suitable material and I find that human hair is of the nature to give satisfactory results although the moisture responsive elements are not limited to the employment of hair but include any other material. Also, it is to be understood that the moisture responsive device 139 may be of a form entirely different from that shown in the drawing which is but one embodiment of several types of moisture responsive devices. As the sampling of the air which passes through the density factor compartment 40 increases in moisture content, the shaft 140 moves to the right as shown in Figure 1 of the drawing. The shaft 140 is likewise surrounded by a shaft seal 94 of the same construction as that employed to surround the shaft 127 which seals the density factor compartment 40 from the variable gearing compartment 39. The absolute pressure responsive device 86 comprises generally a bellows 88 having an open end 91 and a closed end 92 which bears against a spring 89. The bellows 88 is enclosed within a housing 87 to which the open end of the bellows 91 is hermetically connected and sealed. The housing 87 may be connected to the side wall of the density factor compartment 40 by means of a stub shaft and a nut 90 which threadably engages the stub shaft. The space between the bellows 88 and the housing 87 is evacuated so that the movement of the bellows 88 is responsive to the absolute pressure of the air passing through the density factor compartment 40. As the absolute pressure increases, the shaft 93 and the connecting link 102 move to the right as shown in the drawing. A seal 94 surrounds the shaft 93 and seals the density factor compartment 40 from the variable gearing compartment 39. The casing 97 of the density factor compartment 40 may be connected to the variable gearing compartment 39 by cap screws 98. As illustrated, the variable gearing compartment 39 is separated from the density factor compartment 40 by a partition 99 which carries the stuffing boxes for the shaft seals 94.

The weight of air or the quantity of air which passes a given point in a given period of time is a function of the density of the air and the velocity pressure of the air as it passes through a conduit. In my invention the density of the air is compensated for by the combined action of the temperature responsive device 125, the moisture responsive device 139, and the absolute pressure device 86. The velocity pressure of the air is measured or determined by the velocity pressure unit 41 which comprises a cylindrical housing 42 having a balanced vane 43 pivotally mounted therein about a shaft 46. A cross-sectional view of the velocity pressure housing 42 is shown in Figure 3 and illustrates a partition 47 which forms in combination with the balanced vane 43 two compartments 103 and 121. The compartment 103 is connected to the air conduit 30 through a tube 44 which is responsive to the total pressure of the air within the air conduit 30 and the compartment 121 is connected to the air conduit 30 through a tube 45 which is responsive to the static pressure of the air in the air conduit 30. The differential between the total pressure and the static pressure represents the velocity pressure of the air in the conduit 30 and accordingly the movement of the vane 43 is responsive to the velocity pressure of the air in the conduit 30. The upper end of the partition 47 makes a good seal fit with the shaft 46 at the places indicated by the reference character 50 and should any air leak through the bearing surfaces at the reference character 50, the air is permitted to escape through the shaft 46 by way of the openings 48, whereupon the escaped air is admitted to atmosphere through the openings 49 in the cylindrical housing 42. The shaft 46 and the vane 43 are arranged to freely rotate within the housing 42 upon roller bearings 51. The shaft 46 is also constrained against lateral movement by thrust bearings 52 carried by the cylindrical housing 42. An increase in the velocity pressure of the air tends to rotate the vane 43 in Figure 3 in a counter-clockwise direction. The movement of the vane 43 in a counter-clockwise direction is opposed by a spring 60 which is mounted in a housing 59 to the left-hand end of the cylindrical housing 42 in Figure 1. The spring 60 reacts against a slidable worm block 58 which is slidably mounted in the housing 59. The worm block 58 is constrained from turning within the housing 59 by slidably engaging key ways within the housing. As illustrated, the internal surface of the worm block 58 is provided with female threads which are engaged by the threads upon a worm shaft 57 which is actuated by the vane 43 of the velocity pressure unit 41. Therefore, any movement of the vane 43 in a counter-clockwise direction as shown in Figure 3 tends to force the worm block 58 to the left as shown in Figure 4 and compress the spring 60. The left-hand end of the spring 60 abuts against an adjustable plug 61 so that the velocity pressure unit 41 may be adjustably set for calibration purposes. A lock nut 73 engages the adjusting plug 61 to keep it from rotating when once set. The end of the housing 59 is closed by means of a closure plug 62. The velocity pressure unit 41 is carried by a shaft housing 63 which is made integral with the variable gearing compartment 39. The shaft housing 63 is provided with a laterally extending flange 64 through which cap screws 65 pass for engaging the right-hand side wall of the cylindrical housing 42.

The right-hand end of the shaft 46 is provided with a shaft extension 66 having a hollow spline 68 on the right-hand end thereof. The shaft extension 66 is connected to the shaft 46 by means of a shaft connection 67 so that the shaft extension 66 moves in accordance with the rotary movements of the shaft 46 of the velocity pressure unit 41. The extension shaft 66 is supported by roller bearings 72 and a thrust bearing 69. A shaft seal 70 surrounds the shaft extension 66 to seal the variable gearing compartment 39 from the velocity pressure unit 41. Slidably mounted within the hollow spline 68 is a shaft spline 71 which is constrained to the right by means of a spring 84 positioned between the hollow spline 68 and an adjustable nut 85. Connected to the shaft spline 71 are two cross pins 79 that engage slots 80 in a rotor 76 of a variable rotor drive means indicated generally by the reference character 75. An axially slidable shaft 78 is connected to the cross-pins 79 and is arranged to receive axial movement from the shaft 93 which is actuated by the bellows 88 of the absolute pressure device 86 through a thrust bearing 82. Externally the rotor 76 is arranged to rotate in roller bearings 77 carried by a ribbed member 74 in the variable gearing compartment 39. Internally the rotor 76 is arranged to rotate on roller bearings 81 carried by the shaft 78. As illustrated in Figure 2 which shows a perspective view of the variable rotor drive means 114 which embodies substantially the same general construction as the variable drive means 75, the slots 116 are arranged at an angle with respect to the axis of the rotor so that as the cross-pins 115 are moved axially there is a relative movement between the rotor 113 and the shaft 109 to which the cross-pins are connected. Thus, for example, should the shaft 93 of the absolute pressure device 86 move to the right, then the spring 84 constrains the cross-pins 79 to the right with the result that the rotor 76 turns in a counter-clockwise direction as viewed in Figure 1 with respect to the shaft 78. Consequently, the movement of the rotor 76 which is primarily responsive to the movement of the vane 43 of the velocity pressure unit 41 is modified by the movement of the absolute pressure responsive device 86. More specifically, a decrease in the absolute pressure causes the shaft 78 to move to the left and in turn causes the movement of the absolute pressure responsive device 86 to subtract from the movement of the velocity pressure unit 41, and conversely an increase in the absolute pressure causes the movement of the absolute pressure responsive device 86 to add to the movement of the velocity pressure unit 41. Under the condition that the velocity pressure would increase and rotate the shaft 78 in a counter-clockwise direction as indicated by the arrow about the shaft while at the same time should the absolute pressure responsive device 86 axially move the shaft 78 to the left by a decrease in the absolute pressure, then the rotor 76 would not move in the event that the two opposing movements are of the same equivalent value. The shaft 78 is keyed to the internal race of the roller bearings 81 by means of a slidable key connection 100 so that relative movement takes place in the roller bearings 81 instead of between the inside race and the shaft 78. The shaft 78 is free to slide axially within the internal race of the roller bearings 81.

The right-hand end of the rotor 76 is provided with a gear 83 which meshes with a gear 104 which is connected by a slidable key connection to a shaft 105 that engages a variable rotor drive means indicated by the reference character 106 which is of the same general construction as the variable rotor drive means 75. The movement of the shaft 140 which is responsive to the moisture content of the air in the density factor compartment 40 causes the rotor of the variable rotor drive means 106 to be modified to compensate for moisture changes. The variable rotor drive means 106 rotates a gear 107 which meshes with a gear 108 that is connected to a shaft 109 through a slidable key connection 112. The rotation of the shaft 109 actuates the rotor 113 of the variable rotor drive means 114 through the cross-pins 115 engaging angularly disposed slots 116. The rotor 113 is externally supported by ball bearings 117 carried by the vertical rib members 74. Internally the rotor 113 is carried by ball bearings 110 which have their inner race way supported by a shaft sleeve 111 to which the gear 108 is directly connected. The shaft 109 is axially movable within the shaft sleeve 111 through the slidable key connection 112. The movement of the moisture responsive device 139 upon the variable rotor drive means 106 and the movement of the temperature responsive bellows 125 upon the variable rotor drive means 114 are through thrust bearings 82 which is the same as that shown between the absolute pressure responsive device 86 and the variable rotor drive means 75. That is to say, the variable rotor drive means are free to rotate without transmitting any rotary movement to the three density factor means; namely, the temperature responsive device 125, the moisture responsive device 139, and the absolute pressure responsive device 86.

The movement of the shaft 109 to the left upon an increase in temperature is opposed by a spring 129 which is mounted in a spring housing 132 to the left of the variable rotor drive means 114. The right-hand end of the spring 129 acts against a thrust plate 130 which is arranged to slide within the housing 132 upon slideways 131. The left-hand end of the spring 129 is engaged by an adjusting nut 133 which may be turned to calibrate the effect of the temperature responsive device upon the variable rotor drive means 114. A lock nut 134 is employed to retain the adjusting nut 133 in a fixed position after once set and the end of the spring housing may be closed by means of a closure plug 135. The thrust plate 130 carries a shaft 128 which has provided on the end thereof a thrust bearing 118 carried by the cross-pins 115 that engage the slots 116 of the variable rotor drive means 114. The reference character 138 represents the housing for a spring arrangement for opposing the axial movements of the shaft 140 which is responsive to the changes in the moisture content of the air within the density factor compartment 40. The construction of the spring arrangement within the compartment indicated by the reference character 138 is the same as that shown within the spring housing 132 which is associated with the variable rotor drive means 114. A bevel gear 122 is provided on the right-hand end of the variable rotor drive means 114 and is arranged to mesh with another bevel gear 123 that drives a shaft 124. The shaft 124 which gives a measurement of the weight rate of flow of the air may be characterized as a resultant output shaft because it is responsive to the movement of the velocity pressure unit 41 as modified by the temperature responsive unit 125, the moisture responsive unit 139 and the absolute pressure responsive unit 86. In other words, the resultant output shaft 124 produces a movement which is a measurement of the weight of the air or the quantity of the air in the duct 30 passing a given point in a given period of time. Thus the resultant output shaft 124 is a function of the velocity pressure and the density as measured by the combined action of the temperature responsive device 125, the moisture responsive device 139 and the absolute pressure responsive device 86.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, variable drive means for transmitting movement from the first member to the resultant member, an enclosure, means for passing air from the conduit through the enclosure, and means in the enclosure responsive to the density of the air therein for modifying said variable drive means to compensate for density changes, said variable drive means including a rotatable drive member having an angularly disposed slot and an axially arranged shaft having a radially extending element engaging the slot, said shaft being axially movable relative to the rotatable drive member by the density means, whereby slidable movement of the radially extending element in the slot varies the angular relationship between the shaft and the rotatable drive member, said shaft and said rotatable drive member interconnecting the first member and the resultant member.

2. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, variable drive means for transmitting movement from the first member to the resultant member, said variable drive means including at least two variable drive units, an enclosure, means for passing air from the conduit through the enclosure, means in the enclosure responsive to the temperature of the air therein for modifying one of the variable drive units to compensate for temperature changes, and means in the enclosure responsive to the absolute pressure of the air therein for modifying the other variable drive unit to compensate for absolute pressure, each of said variable drive units including a rotatable drive member having an angularly disposed slot and an axially arranged shaft having a radially extending element engaging the slot, said shaft being axially movable relative to the rotatable drive member, whereby slidable movement of the radially extending element in the slot varies the angular relationship between the shaft and the rotatable drive member.

3. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, variable drive means for transmitting movement from the first member to the resultant member, said variable drive means including rotatable means, shaft means disposed for both axial and rotational movements and motion transmitting means between the shaft means and the rotatable means to translate the axial motion of the shaft means into rotary motion of the rotatable means to vary the angular relationship between the shaft means and the rotatable means, an enclosure, means for passing air from the conduit through the enclosure, temperature responsive means in the enclosure, humidity responsive means in the enclosure, and absolute pressure responsive means in the enclosure, and means responsive to the three last mentioned responsive means to operate the shaft means in an axial direction and thereby modify said variable drive means to compensate for temperature, humidity and absolute pressure changes.

4. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, variable drive means for transmitting movement from the first member to the resultant member, said variable drive means including actuating shaft means disposed for both axial and rotational movements, actuating rotatable means mounted on said actuating shaft means and adapted to move relative thereto, one of said actuating means having thereon a cam surface and the other of said actuating means having thereon an element engaging the cam surface, said cam surface and said element constituting motion transmitting means between the shaft means and the rotatable means to translate the axial motion of the shaft means into rotary motion of the rotatable means about said shaft means to vary the angular relationship between the shaft means and the rotatable means, and means responsive to the temperature of the air for operating the shaft means in an axial direction and thereby modifying said variable drive means to compensate for temperature changes.

5. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, variable drive means for transmitting movement from the first member to the resultant member, said variable drive means including actuating shaft means disposed for both axial and rotational movements, actuating rotatable means mounted on said actuating shaft means and adapted to move relative thereto, one of said actuating means having thereon a cam surface and the other of said actuating means having thereon an element engaging the cam surface, said cam surface and said element constituting motion transmitting means between the shaft means and the rotatable means to translate the axial motion of the shaft means into rotary motion of the rotatable means about said shaft means to vary the angular relationship between the shaft means and the rotatable means, and means responsive to the humidity of the air for operating the shaft means in an axial direction and thereby modifying said variable drive means to compensate for humidity changes.

6. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, variable drive means for transmitting movement from the first member to the resultant member, said variable drive means including actuating shaft means disposed for both axial and rotational movements, actuating rotatable means mounted on said actuating shaft means and adapted to move relative thereto, one of said actuating means having thereon a cam surface and the other of said actuating means having thereon an element engaging the cam surface, said cam surface and said element constituting motion transmitting means between the shaft means and the rotatable means to translate the axial motion of the shaft means into rotary motion of the rotatable means about said shaft means to vary the angular relationship between the shaft means and the rotatable means, and means responsive to the absolute pressure of the air for operating the shaft means in an axial direction and thereby modifying said variable drive means to compensate for absolute pressure changes.

7. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, variable drive means for transmitting movement from the first member to the resultant member, said variable drive means including actuating shaft means disposed for both axial and rotational movements, actuating rotatable means mounted on said actuating shaft means and adapted to move relative thereto, one of said actuating means having thereon a cam surface and the other of said actuating means having thereon an element engaging the cam surface, said cam surface and said element constituting motion transmitting means between the shaft means and the rotatable means to translate the axial motion of the shaft means into rotary motion of the rotatable means about said shaft means to vary the angular relationship between the shaft means and the rotatable means, and means responsive to the temperature and the absolute pressure of the air for operating the shaft means in an axial direction and thereby modifying said variable drive means to compensate for temperature and absolute pressure changes.

8. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, variable drive means for transmitting movement from the first member to the resultant member, said variable drive means including three variable drive units, each said variable drive unit, including rotatable means, shaft means disposed for both axial and rotational movements and motion transmitting means between the shaft means and the rotatable means to translate the axial motion of the shaft means into rotary motion of the rotatable means to vary the angular relationship between the shaft means and the rotatable means, means responsive to the temperature of the air for operating the shaft means of the first of said units in an axial direction and thereby modifying the first of said units to compensate for temperature changes, means responsive to the humidity of the air for operating the shaft means of the second of said units in an axial direction and thereby modifying the second of said units to compensate for humidity changes, and means responsive to the absolute pressure of the air for operating the shaft means of the third of said units in an axial direction and thereby modifying the third of said units to compensate for absolute pressure changes.

9. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, variable drive means for transmitting movement from the first member to the resultant member, said variable drive means including at least two variable drive units, each said variable drive units including rotatable means, shaft means disposed for both axial and rotational movements and motion transmitting means between the shaft means and the rotatable means to translate the axial motion of the shaft means into rotary motion of the rotatable means to vary the angular relationship between the shaft means and the rotatable means, means responsive to the temperature of the air for operating the shaft means of one of said units in an axial direction and thereby modifying the said one of said units to compensate for temperature changes, and means responsive to the absolute pressure of the air for operating the shaft means of the said other of said units in an axial direction and thereby modifying the said other of said units to compensate for absolute pressure changes.

10. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, variable drive means for transmitting movement from the first member to the resultant member, said variable drive means including actuating shaft means disposed for both axial and rotational movements, actuating rotatable means mounted on said actuating shaft means and adapted to move relative thereto, one of said actuating means having thereon a cam surface and the other of said actuating means having thereon an element engaging the cam surface, said cam surface and said element constituting motion transmitting means between the shaft means and the rotatable means to translate the axial motion of the shaft means into rotary motion of the rotatable means about said shaft means to vary the angular relationship between the shaft means and the rotatable means, and means responsive to the density of the air for operating the shaft means in an axial direction and thereby modifying said variable drive means to compensate for density changes.

11. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, a first gear, variable drive means for transmitting movement from the first member to the first gear, a resultant gear for transmitting movement to the resultant member, variable drive means for transmitting movement from the first gear to the resultant gear, each said variable drive means including rotatable means, shaft means disposed for both axial and rotational movements and motion transmitting means between the shaft means and the rotatable means to translate the axial motion of the shaft means into rotary motion of the rotatable means to vary the angular relationship between the shaft means and the rotatable means, means responsive to the temperature of the air for operating the shaft means of one of said variable drive means in an axial direction and thereby modifying said one of said variable drive means, and means responsive to the absolute pressure of the air for operating the shaft means of the other of said variable drive means in an axial direction and thereby modifying the said other of said variable drive means.

12. In an air device including a conduit through which the air flows, the improvement of a mechanism for giving the weight rate of flow of the air comprising, in combination, first means responsive to the velocity pressure of the air in the conduit, a first member actuated by the velocity pressure means, a resultant member for giving the weight rate of flow, variable drive means for transmitting movement from the first member to the resultant member, said variable drive means including actuating shaft means disposed for both axial and rotational movements, actuating rotatable means mounted on said actuating shaft means and adapted to move relative thereto, one of said actuating means having thereon a cam surface and the other of said actuating means having thereon an element engaging the cam surface, said cam surface and said element constituting motion transmitting means between the shaft means and the rotatable means to translate the axial motion of the shaft means into rotary motion of the rotatable means about said shaft means to vary the angular relationship between the shaft means and the rotatable means, an enclosure, means for passing air from the conduit through the enclosure, and means in the enclosure responsive to the density of the air therein for operating the shaft means in an axial direction and thereby modifying said variable drive means to compensate for density changes.

THOMAS A. BAKER.

REFERENCES CITED

The following references are of record in the file of this patent:

UNITED STATES PATENTS

| Number | Name | Date |
|---|---|---|
| 1,109,681 | Judson | Sept. 8, 1914 |
| 2,295,728 | Gess | Sept. 15, 1942 |
| 1,865,996 | Young | July 5, 1932 |
| 1,208,494 | Connet | Dec. 12, 1916 |
| 699,014 | Rice | Apr. 29, 1902 |
| 1,281,906 | Bullock | Oct. 15, 1918 |
| 1,679,293 | Dawley | July 31, 1928 |
| 2,123,978 | Wagner | July 19, 1938 |
| 1,401,299 | Wohlenberg | Dec. 27, 1921 |
| 1,894,449 | Sandvoss | Jan. 17, 1933 |
| 1,409,879 | Manley | Mar. 14, 1922 |
| 2,251,498 | Schwein | Aug. 5, 1941 |
| 1,629,252 | Bouza | May 17, 1927 |

FOREIGN PATENTS

| Number | Country | Date |
|---|---|---|
| 193,452 | Great Britain | Feb. 26, 1923 |